United States Patent
Evans et al.

(10) Patent No.: US 7,856,853 B2
(45) Date of Patent: Dec. 28, 2010

(54) ROTARY PROCESS FOR MAKING MINERAL FIBER INSULATION MATERIAL

(75) Inventors: Michael E. Evans, Granville, OH (US); Patrick M. Gavin, Newark, OH (US); Paul S. Dangler, Newark, OH (US); Michael T. Pellegrin, Newark, OH (US); Harold J. Holler, Newark, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 1033 days.

(21) Appl. No.: 11/345,243

(22) Filed: Feb. 1, 2006

(65) Prior Publication Data

US 2007/0175243 A1 Aug. 2, 2007

(51) Int. Cl.
*C03B 37/07* (2006.01)
*C03B 37/04* (2006.01)
*C03B 37/06* (2006.01)

(52) U.S. Cl. ............................ 65/377; 65/460; 65/468; 65/522; 65/517; 431/89; 431/36; 431/41

(58) Field of Classification Search .................. 65/460, 65/468, 377, 469, 470, 521, 522, 516, 517; 431/89, 36–38, 41, 90
See application file for complete search history.

(56) References Cited

U.S. PATENT DOCUMENTS

| | | | |
|---|---|---|---|
| 2,991,507 A | 7/1961 | Levecque et al. | |
| 3,372,012 A | 3/1968 | Porter | |
| 3,395,005 A | 7/1968 | Stelmah | |
| 3,547,610 A | 12/1970 | Holman | |
| 4,263,034 A | 4/1981 | Sistermann et al. | |
| 4,392,879 A * | 7/1983 | Takeuchi et al. | 65/384 |
| 4,457,694 A * | 7/1984 | Maeda et al. | 431/90 |
| 4,645,450 A * | 2/1987 | West | 431/12 |
| 4,737,178 A * | 4/1988 | Reifschneider et al. | 65/384 |
| 5,122,053 A * | 6/1992 | Basten | 431/12 |
| 5,520,533 A * | 5/1996 | Vrolijk | 431/90 |
| 5,997,280 A * | 12/1999 | Welz et al. | 431/90 |
| 6,141,992 A | 11/2000 | Gross et al. | |
| 6,247,919 B1* | 6/2001 | Welz et al. | 431/13 |
| 6,279,870 B1* | 8/2001 | Welz et al. | 251/129.04 |
| 6,332,408 B2* | 12/2001 | Howlett et al. | 110/189 |
| 6,584,809 B1 | 7/2003 | Gross et al. | |
| 6,843,075 B2* | 1/2005 | Bennett | 65/378 |
| 2004/0106078 A1* | 6/2004 | Goebel | 431/12 |
| 2005/0098670 A1* | 5/2005 | Lasalle et al. | 241/261.2 |

FOREIGN PATENT DOCUMENTS

GB 923700 4/1963

* cited by examiner

*Primary Examiner*—Jason L. Lazorcik
(74) *Attorney, Agent, or Firm*—MacMillan, Sobanski & Todd, LLC

(57) ABSTRACT

A method of manufacturing mineral fibers includes rotating an orificed spinner and supplying molten mineral material to the spinner to centrifuge streams of molten mineral material. A downward annular flow of attenuating gases is directed to attenuate the streams of molten mineral material into mineral fibers. A mixture of combustion air and combustion gas is supplied to an annular burner positioned around the spinner. Heat from the annular burner is directed toward the spinner and the streams of molten mineral material to heat the spinner and assist in attenuating the streams of molten mineral material into mineral fibers. A pressure sensor senses the pressure of the combustion air prior to the introduction of the combustion air to the burner. The pressure of the combustion air is controlled in response to the sensed pressure to maintain the pressure of the combustion air at a specific pressure.

21 Claims, 2 Drawing Sheets

ROTARY PROCESS FOR MAKING MINERAL FIBER INSULATION MATERIAL

TECHNICAL FIELD

This invention relates to apparatus and a method of fiberizing mineral fibers, such as glass fibers, from molten mineral material using a rotary process.

BACKGROUND OF THE INVENTION

The production of mineral fibers such as glass fibers by a rotary process is well known. In this process, molten glass is fed at a high temperature into a metallic spinner which revolves at a high rotation rate. The spinner has a peripheral wall containing a multiplicity of orifices. The molten glass flows by centrifugal force through the orifices and forms small diameter molten glass streams. The streams are directed downward toward a collection surface by an annular blower which surrounds the spinner. The flow generated by the blower attenuates the molten glass streams into a finer diameter, and the streams are cooled to form glass fibers. An annular burner is also positioned around the spinner, and combustion gases and heat from the burner are directed downward to provide a fiber attenuating environment suitable for allowing the initial streams of glass to be attenuated to the desired final diameter. The downward annular flow of hot gases facilitates attenuation of the streams of molten mineral material into mineral fibers by the blower, and also maintains the spinner at a temperature suitable for fiberizing.

SUMMARY OF THE INVENTION

According to this invention there is provided a method of manufacturing mineral fibers including rotating an orificed spinner and supplying molten mineral material to the spinner to centrifuge steams of molten mineral material. A downward annular flow of attenuating gases is directed to attenuate the streams of molten mineral material into mineral fibers. A mixture of combustion air and combustion gas is supplied to an annular burner positioned around the spinner. Heat from the annular burner is directed toward the spinner and the streams of molten mineral material to heat the spinner and assist in attenuating the streams of molten mineral material into mineral fibers. A pressure sensor senses the pressure of the combustion air prior to the introduction of the combustion air to the burner. The pressure of the combustion air is controlled in response to the sensed pressure to maintain the pressure of the combustion air at a specific pressure.

According to this invention there is also provided a method of manufacturing mineral fibers including rotating an orificed spinner and supplying molten mineral material to the spinner to centrifuge steams of molten mineral material. A downward annular flow of attenuating gases is directed to attenuate the streams of molten mineral material into mineral fibers. A mixture of combustion air and combustion gas is supplied to an annular burner positioned around the spinner. Heat from the annular burner is directed toward the spinner and the streams of molten mineral material to heat the spinner and assist in attenuating the streams of molten mineral material into mineral fibers. The temperature of the combustion air is sensed with a temperature sensor prior to the introduction of the combustion air to the burner. The temperature of the combustion air is controlled in response to the sensed temperature to maintain the temperature of the combustion air at a specific temperature.

According to this invention there is also provided a method of manufacturing mineral fibers including rotating an orificed spinner and supplying molten mineral material to the spinner to centrifuge steams of molten mineral material. A downward annular flow of attenuating gases is directed to attenuate the streams molten mineral material into mineral fibers. Heat and combustion gases are directed toward the spinner and the streams of molten mineral material. Combustion gases and combustion air are supplied to the burner, and the combustion air is dried prior to its introduction to the burner.

Various objects and advantages of this invention will become apparent to those skilled in the art from the following detailed description of the preferred embodiment, when read in light of the accompanying drawings.

DETAILED DESCRIPTION OF THE INVENTION

The description and drawings disclose apparatus and a method for manufacturing loosefil fibrous insulation of glass fibers. It is to be understood that the invention can be carried out using any molten mineral material, such as molten rock, slag and basalt, to make mineral fibers. Also, the process can be used to manufacture mineral fibers that are used to make other fibrous products, including insulation products, such as insulation batts and blankets, and including structural fibrous products such as duct board and pipe insulation.

Figure 1:
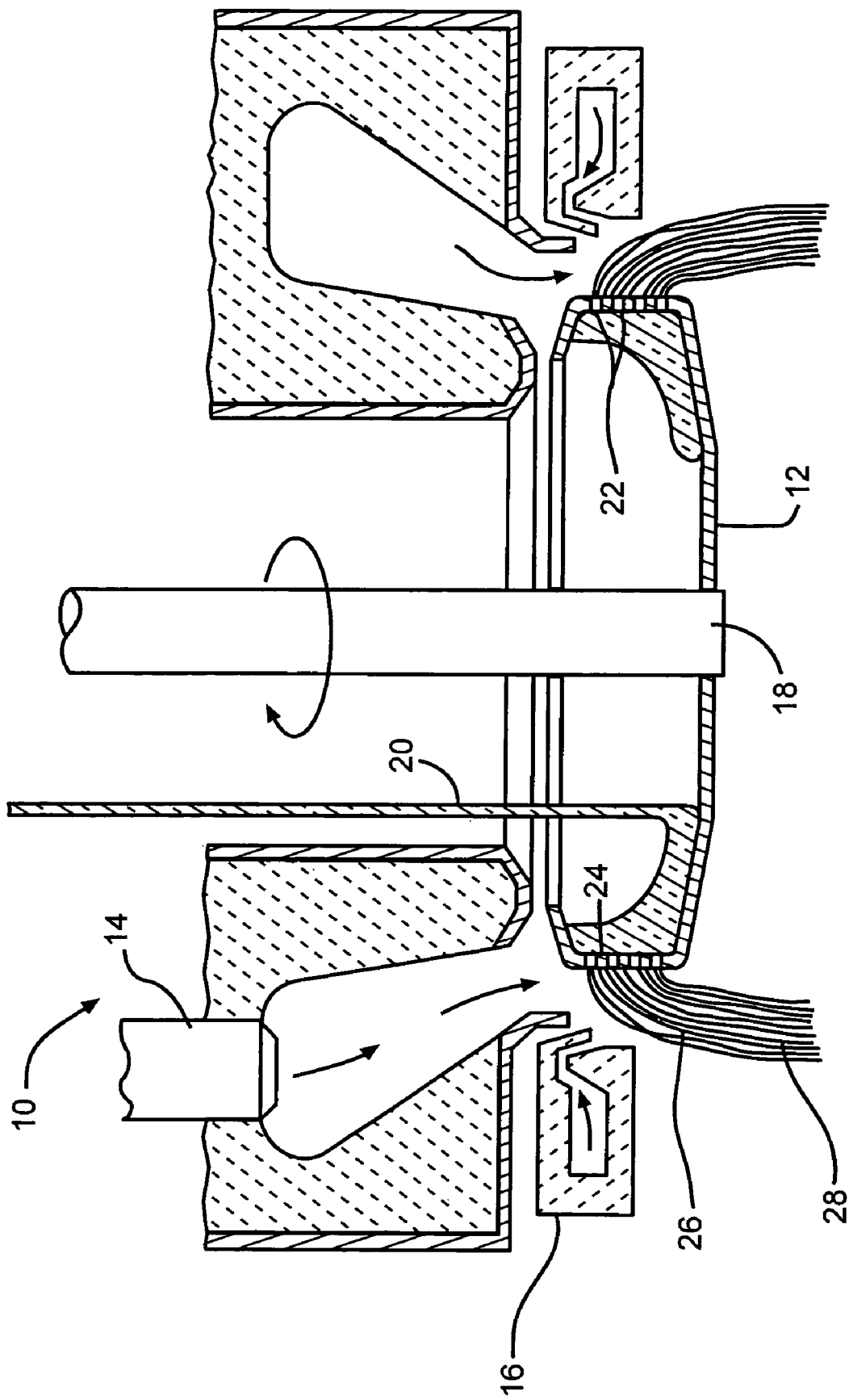
FIG. 1 is a schematic cross-sectional view in elevation of apparatus for forming glass fibers.

As shown in FIG. 1, the fiberizing apparatus, indicated generally at 10, includes a spinner 12, an annular burner 14 and an annular blower 16. The spinner is rotated on an axle or quill 18. A stream 20 of molten glass is delivered from a glass melting furnace, not shown, and the molten stream 20 drops into the interior of the rotating spinner 12. The centrifugal forces of the rotating spinner force the molten glass to emanate from the spinner through orifices 22 in the spinner peripheral wall 24. The molten glass is centrifuged in the form of fine glass streams 26 that are turned downwardly and attenuated into glass fibers 28 by the action of the blower 16. The blower 16 has sufficient force that it induces a flow of air from the surrounding environment. The blower gases and the induced air attenuate the glass fibers 28 into their final fine diameter, typically within the range of from about 3 to about 8 microns, although fibers of other diameters can be used. The burner 14 is typically gas fired and supplies heat to the spinner and to the fiber forming environment into which the molten glass streams 22 are flowing. It is to be understood that the attenuating gases can be provided by the annular blower 16, or can be supplied by the burner 14 itself, or by any other mechanism.

Subsequent to the fiber forming process, various additives can optionally be added to the glass fibers 24. These additives can include oils, lubricants and binders. Water can also be sprayed in the vicinity of the fibers 28 to control the environment. The glass fibers 28 travel downwardly after attenuation, and are collected as insulation products by an appropriate fiber collection apparatus, many of which are known to those skilled in the art. After collection, the glass fibers are packaged in bags or other appropriate packaging for transportation to the customer. The glass fibers 28 can be used in the form of loosefil insulation products suitable for use as blowing wool insulation, or can be formed into batts or blankets useful for insulating insulation cavities in buildings or for structural insulation products, such as ductboard or pipe insulation products.

Figure 2:
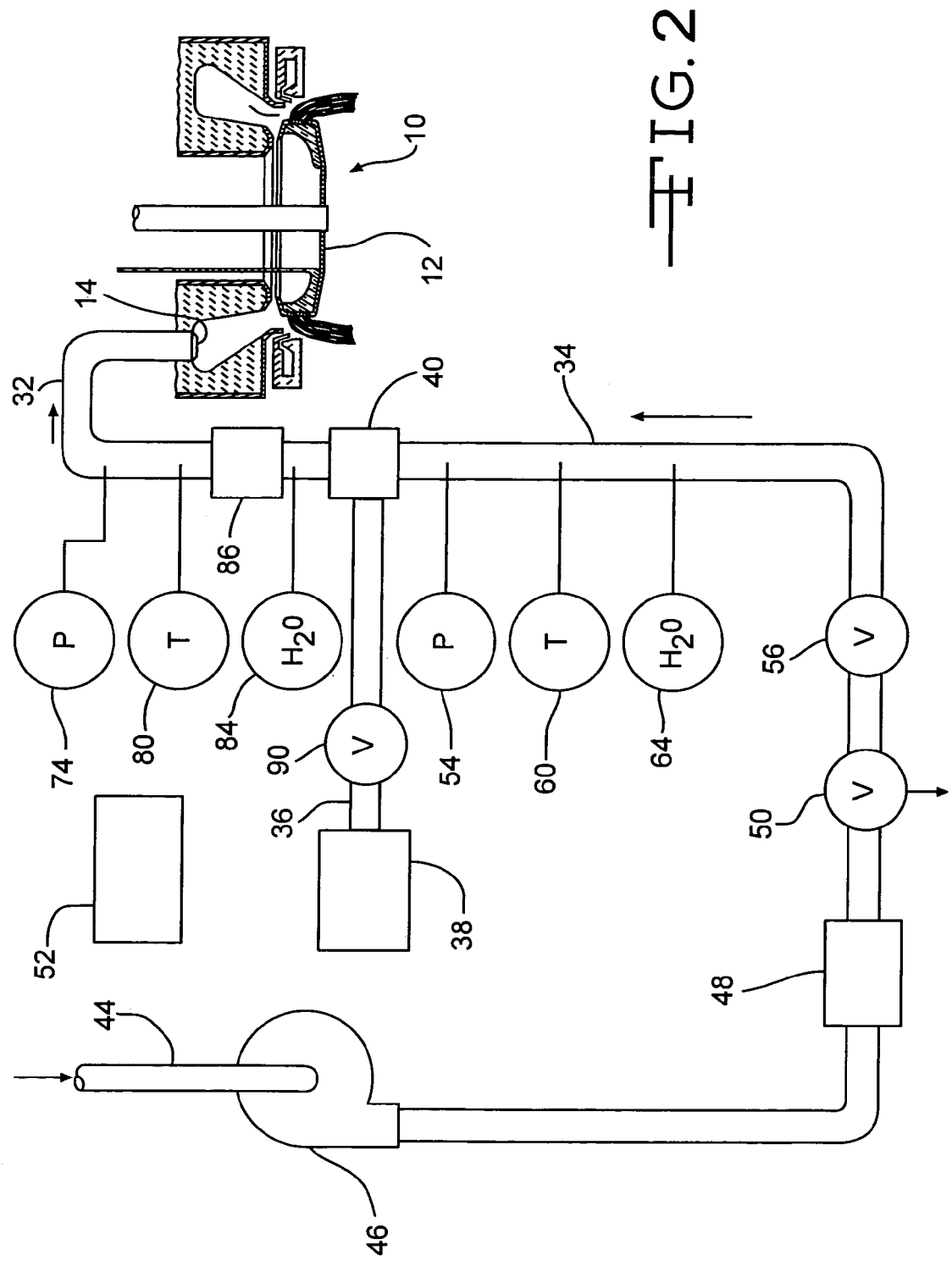
FIG. 2 is a schematic diagram of the air and gas flow leading to the fiberizer shown in FIG. 1.

As shown in FIG. 2, the burner 14 of the fiberizer 10 is supplied with an air and gas mixture by means of an air/gas mix conduit, such as air/gas line 32. The air/gas line 32 is supplied with air by an air supply conduit, such as air supply line 34. The air/gas line 32 is also supplied with combustible gas by a gas conduit, such as gas supply line 36. The gas supply line 36 is supplied with combustion gas from any suitable source, such as a pressurized gas supply 38. The combustion gas from the gas supply line 36 is mixed at the mixing junction 40 with the air from the air supply line 34 to form the mixed air and gases flowing through the air/gas mix line 32.

As shown in FIG. 2, the air supply line 34 is supplied with air from an air intake 44, which can be connected to outside air or air from any other suitable source. A fan 46 is positioned in the air supply line 34 to drive the air through the system all the way to the fiberizer 10. The fan 46 can be positioned at any suitable location along the air supply line 34 or the air/gas line 32. Any other suitable means for driving the air through the system, such as an air compressor, can be used. A heat exchanger 48 is positioned to control the temperature of the air flowing through the air supply line 34. In common operational situations the air from the intake must be chilled, so typically the heat exchanger 48 is a chiller configured to cool the intake air. The heat exchanger can be any mechanism for changing the temperature of the intake air in a controllable way, such as, for example, cold water chiller, a hot water or steam heater, an evaporative cooling apparatus, and an electric heater. Although the heat exchanger 48 is shown as being positioned downstream from the fan 46, it could be placed upstream of the fan. A relief valve 50 can optionally be positioned in the air supply line 34 to allow some air to escape from the system in situations where the air pressure in the supply line 34 exceeds a specified level. The relief valve can be any mechanism for reducing the pressure in the air supply line when the pressure is greater than desired. The relief valve 50 can be controlled by any suitable mechanism, such as a controller 52, or can be configured to operate automatically to allow air to escape from the air supply line 34 when the pressure exceeds a specified value.

The air supply line 34 also includes a pressure sensor 54 for measuring or sensing the air pressure within the air supply line 34. The pressure sensor 54 can be any mechanism for sensing the air pressure in the line 34. An example is a Rosemount Hart Tri-loop analog pressure signal converter. The pressure sensor 54 is connected to a controller 52, and signals from the pressure sensor 54 provide the controller 52 with information regarding the air pressure in the air supply line 34.

The air supply line 34 further includes a temperature sensor 60 for measuring or sensing the air temperature within the air supply line 34. The temperature sensor 60 can be any mechanism for sensing the temperature of the air in the line 34. Examples include thermometers and thermostats. One suitable temperature sensor is a Rosemont Smart Head Mount temperature XMTR and sensor assembly, single element, spring loaded. The temperature sensor 60 is also connected to the controller 52, and signals from the temperature sensor 60 provide the controller 52 with information regarding the air temperature in the air supply line 34.

The air supply line 34 is also provided with a moisture sensor 64 for measuring or sensing the moisture level of the air within the air supply line 34. The moisture sensor 64 can be any mechanism for sensing the moisture level of the air in the line 34. An example of a moisture sensor is a humidistat. A Vaisala model DMP248-B1A0A2AA2EL5P dew point transmitter can also be used. The moisture sensor 64 is connected to the controller 52, and signals from the moisture sensor 64 provide the controller 52 with information regarding the moisture level of the air in the air supply line 34.

When the fiberizer 10 is in operation, the air/gas line 32 supplies a mixture of air and gas to the burner 14. The pressure sensor 54 operates to sense the pressure of the combustion air prior to the introduction of the combustion air to the burner. The controller 52 receives a signal from the pressure sensor 54. The controller can be configured to control the relief valve 50 in response to the sensed pressure by the pressure sensor 54. By controlling the relief valve 50, the pressure of the combustion air in the air supply line 34 is controlled in response to the sensed pressure to maintain the pressure of the combustion air reaching the burner 14 at a specific pressure.

The relief valve 50 is not the only way to change the air pressure in the line 34 in response to the sensed pressure, as other mechanisms can also be used. One other method for controlling the air pressure in response to the sensed pressure is to modify the fan 46 to change the air pressure in the air supply line 34. An additional method is to control the flow of air in the air supply line 34 with a valve 56.

Controlling the pressure of the combustion air is a useful tool in controlling the overall fiberizing process for making glass fibers. The pressure of the combustion air can be modulated to affect the flame and combustion process occurring in the burner 14. The flame and combustion process can affect product properties for the glass fibers, including such properties as the strength of the fibers, the length of the fibers, the stiffness of the fibers, and the K-value of insulation products made with the fibers. The air pressure modulation can be used to counteract or overcome external process variations that occur over both short and long time spans. External process-affecting variations include the temperature, atmospheric pressure and the moisture level of the intake air. Other process variations that can possibly be countered by adjustment of the pressure of the combustion air include the nature or quality of the combustion gas, and the chemical nature, viscosity or other characteristics of the molten glass.

Although the pressure sensor 54 is shown as being positioned upstream of the mixing junction 40, in an alternative embodiment the pressure of the mixture of combustion air and combustion gas can be sensed at a position downstream from the mixing junction 40. Pressure sensor 74 is connected to the air/gas line 32 to sense the pressure of the mixture of combustion air and combustion gas at a location subsequent to the mixing of the air and gas at the mixing junction 40. The pressure sensor 74 is connected to the controller 52, and the fiberizing process can be controlled in response to the pressure sensed by pressure sensor 74.

Another variable besides air pressure that can be monitored and used to control the operation of the fiberizer 10 is the temperature of the combustion air. The temperature sensor 60 operates to sense the temperature of the combustion air prior to the introduction of the combustion air to the burner 14. The controller 52 receives a signal from the temperature sensor 60. The controller can be configured to control the temperature of the air flowing through the air line 34 in response to the temperature sensed by the temperature sensor 60. This control of the temperature by the controller 52 in response to the temperature sensor 60 can be by control of the operation of the heat exchanger 48. For example, when the signals from the temperature sensor 60 indicate that the temperature of the combustion air is higher than a desired or set point temperature, the controller 52 can operate the heat exchanger 48 to cool the air by an amount appropriate to return the temperature of the air in the air line 34 to the desired level. As used in this specification, a reference to a set point or specific value of pressure or temperature or moisture level, can mean a specific desired value or a range of acceptable values for the parameter. Other means besides the heat exchanger 48 can be used to modify the temperature of the combustion air in response to the sensed temperature of the combustion air.

Although the temperature sensor 60 is shown as being positioned upstream of the mixing junction 40, in an alternative embodiment the temperature of the mixture of combustion air and combustion gas can be sensed at a position downstream from the mixing junction 40. Temperature sensor 80 is connected to the air/gas line 32 to sense the temperature of the mixture of combustion air and combustion gas at a location subsequent to the mixing of the air and gas at the mixing junction 40. The temperature sensor 80 is connected to the controller 52, and the fiberizing process can be controlled in response to the temperature sensed by temperature sensor 80.

The heat exchanger 48 is shown as being positioned upstream of the mixing junction 40. In an alternate embodiment, a heat exchanger 86 is positioned downstream from the mixing junction 40, for controlling the temperature of the mixed air and combustion gas in response to the command of the controller.

During operation of the fiberizer, signals from the moisture sensor 64 can be used to control the fiberizing process. When the moisture level of the air in the air supply line 34 is too high, the air can be dried by cooling the air in the heat exchanger 48, or with any other means, such as a regenerative desiccant dryer. A pre-engineered packaged refrigerant type air dryer can also be used. A moisture sensor 84 can be positioned downstream from the mixing junction 40 to sense the moisture level of the combined air and combustion gas.

Another process step that can be used to control the fiberizing process is the use of a calculated flame temperature. The flame temperature can be calculated using polynomial curves fit to data from a commercial computer code, as would be known by those skilled in the art. Once calculated, the flame temperature can be used in conjunction with the moisture content of the air, as measured by the moisture sensor 64, to modify the air/gas ratio to maintain the flame temperature at a constant. In some fiberizing operations the air/gas ratio is controlled to maintain a high level of quality of the glass fibers. The air/gas ratio can be controlled in any manner, such as by using a valve 90 in the combustion gas line 36. Typical air/gas ratios are between 9.6 and 10.6 to 1, although other ratios can be used. This allows a residual oxygen level within the range of from about 0.25 percent to about 2.0 percent. According to this process, the air/gas ratio is controlled to maintain the calculated flame temperature substantially constant in response to the measured moisture content of the combustion air. The modification of the air/gas ratio can be controlled by the controller 52 using an algorithm.

The process disclosed above includes sensing of the pressure, temperature and moisture content of the combustion air using sensors 54, 60, 64, 74, 80 and 84. When using the process of the invention, it should be recognized that closer the sensors are to the burner 14, the more accurate will be the sensed parameters.

The principle and mode of operation of this invention have been described in its preferred embodiments. However, it should be noted that this invention may be practiced otherwise than as specifically illustrated and described without departing from its scope.

What is claimed is:

1. A method of manufacturing mineral fibers comprising:
   rotating an orificed spinner and supplying molten mineral material to the spinner to centrifuge streams of molten mineral material;
   directing a downward annular flow of attenuating gases to attenuate the streams of molten mineral material into mineral fibers;
   mixing combustion air and combustion gas and supplying the mixture to an annular burner positioned around the spinner;
   directing hot gases from the annular burner toward the spinner and the streams of molten mineral material to heat the spinner and assist in attenuating the streams of molten mineral material into mineral fibers;
   sensing with a pressure sensor the pressure of the combustion air prior to the mixing of the combustion air and combustion gas;
   controlling the pressure of the combustion air in response to the sensed pressure to maintain the pressure of the combustion air at a specific pressure;
   sensing the temperature of the combustion air prior to the mixing of the combustion air and combustion gas; and
   prior to the mixing the combustion air and combustion gas, controlling the temperature of the combustion air in response to the sensed temperature to maintain the combustion air at a specific temperature.

2. The method of claim 1 in which the supply of combustion air is generated by a fan which produces pressurized air for combustion, and in which the step of controlling the pressure of the combustion air in response to the sensed pressure to maintain the pressure of the combustion air at a specific pressure is carried out by removing air from the pressurized air until the specific pressure is reached.

3. The method of claim 1 including combining combustion air, from a supply of combustion air, with combustion gas from a supply of combustion gas to form the mixture of combustion air and combustion gas, and also sensing the pressure of the mixture of combustion air and combustion gas at a location subsequent to the forming of the mixture of the combustion air and combustion gas.

4. The method of claim 1 further including:
   calculating the temperature of a flame from the burner;
   measuring the moisture content of the combustion air with a moisture sensor; and
   modifying the air/gas ratio to maintain the calculated flame temperature substantially constant in response to the measured moisture content of the combustion air.

5. The method of claim 1 in which the modifying of the air/gas ratio to control the calculated flame temperature is carried out with an algorithm.

6. The method of claim 1 including controlling the mass flow of gases supplied to the burner in response to the calculated flame temperature.

7. The method of claim 1 further including drying the combustion air prior to its introduction to the burner by cooling the air.

8. A method of manufacturing mineral fibers comprising:
   rotating an orificed spinner and supplying molten mineral material to the spinner to centrifuge streams of molten mineral material;
   directing a downward annular flow of attenuating gases to attenuate the streams of molten mineral material into mineral fibers;
   mixing combustion air and combustion gas and supplying the mixture to an annular burner positioned around the spinner;

directing hot gases from the annular burner toward the spinner and the streams of molten mineral material to heat the spinner and assist in attenuating the streams of molten mineral material into mineral fibers;

sensing the temperature of the combustion air with a temperature sensor prior to the mixing of the combustion air and combustion gas; and prior to the mixing the combustion air and combustion gas, controlling the temperature of the combustion air in response to the sensed temperature to maintain the temperature of the combustion air at a specific temperature.

9. The method of claim 8 in which the step of controlling the temperature of the combustion air in response to the sensed temperature is carried out by passing the combustion air through a heat exchanger.

10. The method of claim 9 in which the heat exchanger is positioned at a location prior to the forming of the mixture of the combustion air and combustion gas.

11. The method of claim 9 in which the heat exchanger is positioned at a location subsequent to the forming of the mixture of the combustion air and combustion gas.

12. The method of claim 8 further including:
calculating the temperature of a flame from the burner;
measuring the moisture content of the combustion air with a moisture sensor; and
modifying the air/gas ratio to maintain the calculated flame temperature substantially constant in response to the measured moisture content of the combustion air.

13. The method of claim 12 in which the modifying of the air/gas ratio to control the calculated flame temperature is carried out with an algorithm.

14. The method of claim 12 including controlling the mass flow of gases supplied to the burner in response to the calculated flame temperature.

15. The method of claim 8 further including drying the combustion air prior to its introduction to the burner by cooling the air.

16. A method of manufacturing mineral fibers comprising:
rotating an orificed spinner and supplying molten mineral material to the spinner to centrifuge streams of molten mineral material;
directing a downward annular flow of attenuating gases to attenuate the streams molten mineral material into mineral fibers;
directing heat and combustion gases toward the spinner and the streams of molten mineral material;
supplying combustion gases to the burner;
supplying combustion air to the burner;
sensing with a moisture sensor the moisture content of the combustion air;
drying the combustion air in a dryer prior to its introduction to the burner; and
controlling the dryer in response to the sensed moisture of the combustion air.

17. The method of claim 16 further including:
calculating the temperature of a flame from the burner;
measuring the moisture content of the combustion air with a moisture sensor; and
modifying the air/gas ratio to maintain the calculated flame temperature substantially constant in response to the measured moisture content of the combustion air.

18. The method of claim 17 in which the modifying of the air/gas ratio to control the calculated flame temperature is carried out with an algorithm.

19. The method of claim 17 including controlling the mass flow of gases supplied to the burner in response to the calculated flame temperature.

20. The method of claim 16 in which the drying of the combustion air is carried out by cooling the air.

21. The method of claim 16 including sensing the temperature of the combustion air prior to its introduction to the burner and controlling the temperature of the combustion air in response to the sensed temperature to maintain the combustion air at a specific temperature, wherein the drying of the combustion air is carried out prior to the sensing and controlling of the temperature of the combustion air.

\* \* \* \* \*